United States Patent
Perron et al.

(10) Patent No.: US 11,480,496 B2
(45) Date of Patent: Oct. 25, 2022

(54) TEST METHOD FOR CHARACTERIZING AN OPTICAL FIBER LINK

(71) Applicant: EXFO Inc., Quebec (CA)

(72) Inventors: Stephane Perron, Quebec (CA); Eric Thomassin, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 17/198,686

(22) Filed: Mar. 11, 2021

(65) Prior Publication Data

US 2021/0199536 A1 Jul. 1, 2021

Related U.S. Application Data

(63) Continuation-in-part of application No. 16/719,124, filed on Dec. 18, 2019, now abandoned.

(60) Provisional application No. 62/781,737, filed on Dec. 19, 2018.

(51) Int. Cl.
| | |
|---|---|
| *G01M 11/00* | (2006.01) |
| *G01D 5/26* | (2006.01) |
| *G01B 11/02* | (2006.01) |

(52) U.S. Cl.
CPC ......... *G01M 11/3127* (2013.01); *G01B 11/02* (2013.01); *G01D 5/268* (2013.01)

(58) Field of Classification Search
CPC ...... G01M 11/3127; G01B 11/02; G01D 5/28
USPC ...................................................... 356/73.1
See application file for complete search history.

(56) References Cited

U.S. PATENT DOCUMENTS

| | | | |
|---|---|---|---|
| 5,253,035 A * | 10/1993 | Fukuoka ................ | G02B 6/245 356/73.1 |
| 7,515,276 B2 | 4/2009 | Froggatt et al. | |
| 10,171,161 B1 * | 1/2019 | Côté ................... | H04B 10/6161 |
| 10,374,746 B1 * | 8/2019 | Lawrence .............. | H04B 10/25 |
| 2004/0156605 A1 * | 8/2004 | Gleason ............... | G02B 6/4467 385/123 |
| 2013/0194566 A1 * | 8/2013 | Schell .................. | G02B 6/4292 356/73.1 |
| 2014/0071436 A1 * | 3/2014 | Cyr ..................... | G01M 11/3181 356/73.1 |

(Continued)

FOREIGN PATENT DOCUMENTS

JP 2018011279 A * 1/2018

OTHER PUBLICATIONS

Archana, "VIAVI Revolutionizes IT Troubleshooting with Industry-first End-user Experience Score", ItVoice, Online IT Magazine India, Oct. 3, 2018.

(Continued)

*Primary Examiner* — Tarifur R Chowdhury
*Assistant Examiner* — Omar H Nixon
(74) *Attorney, Agent, or Firm* — Hélène Chotard

(57) ABSTRACT

There is provided a test method and system for characterizing an optical fiber link. At least one OTDR acquisition or at least one OLTS acquisition is performed on the optical fiber link. From the acquisition, a value of an excess insertion loss and/or an excess optical return loss associated with the optical fiber link under test is derived, i.e. in excess of a nominal value associated with a hypothetical optical fiber link having a length corresponding to the total length of the optical fiber link under test. A rating value (e.g., as a five-star rating) or a binary pass/fail value associated with the optical fiber link under test can then be derived and displayed.

21 Claims, 10 Drawing Sheets

(56) References Cited

U.S. PATENT DOCUMENTS

| | | | |
|---|---|---|---|
| 2016/0041065 A1* | 2/2016 | L'Heureux | G01M 11/3154 |
| | | | 356/73.1 |
| 2016/0187224 A1 | 6/2016 | Chen et al. | |
| 2016/0248499 A1* | 8/2016 | Perron | H04B 10/071 |
| 2017/0350734 A1* | 12/2017 | Ji | G01D 5/35358 |
| 2018/0205455 A1* | 7/2018 | Mattos | H04B 10/07955 |
| 2019/0306044 A1 | 10/2019 | Cohen et al. | |

OTHER PUBLICATIONS

Park et al., "Coded optical time domain reflectometry: principle and applications", Proc, of SPIE vol. 6781, 678129, 2007.

* cited by examiner

TEST METHOD FOR CHARACTERIZING AN OPTICAL FIBER LINK

TECHNICAL FIELD

The present description generally relates to test methods for characterizing a quality of an optical fiber link in accordance with a quality rating model.

BACKGROUND

Optical Time-Domain Reflectometry (OTDR—also used to refer to the corresponding device) is also widely employed for characterization of optical fiber links. OTDR is a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain and insertion loss of the fiber link under test, as well as each component along the link, can be characterized.

OTDR technology can be implemented in different manners and advanced OTDR technology typically involves multi-pulse acquisitions and analysis whereby the OTDR device makes use of multiple acquisitions performed with different pulse widths in order to provide different spatial resolution and noise level conditions for event detection and measurement along the optical fiber link under test and provide a complete mapping of the optical link.

It is common in the art to characterize events along an optical fiber link by attributing values to three different characteristics: the location of the event along the optical fiber link, the insertion loss associated with the event and the reflectance at the event (when present). An assessment of the link under test, including any discrete event, is typically performed by comparing measured values of insertion loss and reflectance to pass/fail thresholds. Pass/fail thresholds may be applied to each located event, as well as to the total insertion loss and the total optical return loss of the optical fiber link under test. If any one of the measured values (event-specific or global) does not meet the pass/fail threshold, the optical fiber link is flagged as a FAIL. Pass/fail thresholds are inherently binary and poorly inform the user of the overall health of an optical fiber link.

When assessing a link based on the pass/fail threshold model, characterization of each event along the fiber link is required in order to apply the pass/fail thresholds and identify any potential issue along the fiber link. A pre-set pass/fail threshold applied to the total insertion loss or the total optical return loss of the link does not provide any information on the overall health of an optical fiber link because the source of the loss (intrinsic and unavoidable fiber loss vs avoidable poor connectors), remains unknown. A complete and accurate mapping of every event along an optical fiber link is therefore required in order to properly apply the pass/fail thresholds. Such accurate mapping often requires multi-pulse acquisitions, which involves substantial measurement time.

Optical Loss Test Sets (OLTS) are advanced implementations of the Light Source-Power Meter (LSPM) insertion loss measurement solution. Each OLTS unit comprises both a light source and a power meter. Connecting an OLTS unit to each end of a link under test allows for bidirectional insertion loss measurement, as well as a measurement of the total length of the link under test by calculating a time of flight of an optical signal between the two OLTS units.

OLTS units typically implement an optical fiber link assessment method based on variable pass/fail thresholds applied to the total insertion loss or the total optical return loss and calculate the loss budget or threshold without a complete and accurate mapping. Such methods may be based on a loss budget that is being established as a function of the number of optical connectors and/or splices along the link, which needs to be known and provided by the user.

There therefore remains a need for a characterization method that can characterize an optical fiber link and provide information on the overall quality of an optical fiber link in a time-efficient manner and/or with minimal or no user configuration.

SUMMARY

There is provided a test method and system for characterizing an optical fiber link. At least one OTDR acquisition or at least one OLTS acquisition is performed on the optical fiber link. From the OTDR acquisition, a value of an excess insertion loss and/or excess back reflections associated with the optical fiber link under test is derived, i.e. in excess of a nominal value corresponding to a hypothetical optical fiber link having a length corresponding to the total length of the optical fiber link under test. A rating value (e.g., a five-star rating) or a binary pass/fail value associated with the optical fiber link under test may then be derived and displayed.

The provided test method quickly provides an estimation of the overall quality of the optical fiber link without necessarily fully characterizing each and every event along the optical fiber link.

The provided test method also provides an estimation of the overall quality of the optical fiber link without necessitating user configuration on the number of optical connectors and/or splices along the link, or pass/fail thresholds. Conversely, the provided test method accounts for any excessive number of optical connectors and/or splices to estimate the overall quality of the optical fiber link. As such, the provided test method is more informative than a simple comparison of total insertion loss and/or total optical return loss.

The provided test method may advantageously be used to compare the overall quality of optical fiber links on same quality model, regardless of the respective total lengths of the compared optical fiber links.

It may further be advantageously used to track the evolution of the overall quality of an optical fiber link subject to repair to indicate whether the repair represents a positive impact to the quality, irrespective of binary pass/fail thresholds.

In accordance with one aspect, there is provided a method for characterizing an optical fiber link, the method comprising:

performing at least one OTDR acquisition toward the optical fiber link, wherein the OTDR acquisition comprises propagating in the optical fiber link under test, a pulsed test signal and detecting corresponding return light from the optical fiber link representing backscattered and reflected light as a function of distance in the optical fiber link;

from the OTDR acquisition, deriving a value of a first excess parameter associated with the optical fiber link under test, in excess of a nominal value of said first parameter associated with a hypothetical optical fiber link having a length corresponding to the total length of the optical fiber link under test;

wherein said first parameter consists of an insertion loss or back reflections of the optical fiber link under test.

In accordance with another aspect, there is provided a method for characterizing an optical fiber link, the method comprising:

propagating a test signal test in the optical fiber link under test from one end thereof and detecting a power level of said test signal at the other end of the optical fiber link to derive therefrom a total insertion loss of the optical fiber link;

calculating a time of flight of said test signal between the one end and the other end and deriving therefrom a total length of the optical fiber link;

deriving a value of an excess insertion loss associated with the optical fiber link under test, in excess of a nominal value of insertion loss associated with a hypothetical optical fiber link having a length corresponding to the measured total length of the optical fiber link under test.

The thereby provided method allows to provide an estimation of the excess insertion loss or the excess back reflections associated with the optical fiber link under test, in excess to a hypothetical optical fiber link of the measured length. These parameters can be used as representative indicators of the overall quality of the optical fiber link. The excess insertion loss and/or the excess back reflections provide a linearly scaled appreciation (as opposed to binary) of the overall health of the optical fiber link. The quality of the optical fiber link can therefore be estimated from an overall characterization of the optical fiber link, without necessarily characterizing each and every event along the optical fiber link and without necessitating user configuration of the number of optical connectors and/or splices along the link, or pass/fail thresholds.

In embodiments described herein, either or both excess insertion loss (eIL) or excess back reflections (eBR) are derived.

The nominal value of the first parameter is "nominal" in the sense that it accounts for intrinsic and/or unavoidable fiber insertion loss or back reflections but does not include additional and avoidable fiber insertion loss or reflectance caused for example by connectors, poor splices, optical fiber bends, localized optical fiber defects and/or any other excessive optical fiber loss. The nominal value may further account for an average number of good splices and connectors that can be expected to be present along a hypothetical optical fiber link of average quality.

In some embodiments, the nominal value is calculated, for example from the measured value of total length and a constant of proportionality related, e.g. to the attenuation constant of the optical fiber, or derived from the OTDR acquisition, and said value of said first excess parameter is derived by deducting the nominal value of said first parameter from the measured value of the total parameter.

In accordance with another aspect, there is provided a method for characterizing an optical fiber link, the method comprising:

performing at least one OTDR acquisition toward the optical fiber link, wherein the OTDR acquisition comprises propagating in the optical fiber link under test, a pulsed test signal and detecting corresponding return light from the optical fiber link representing backscattered and reflected light as a function of distance in the optical fiber link;

from the OTDR acquisition, deriving a rating value associated with the optical fiber link, related to a value of a first excess parameter associated with the optical fiber link under test, in excess of a nominal value of a first parameter associated with a hypothetical optical fiber link having a length corresponding to the total length of the optical fiber link under test; and wherein said first parameter consists of an insertion loss or back reflections of the optical fiber link.

The thereby provided method allows to quickly provide a multi-level scaled appreciation (as opposed to a binary result) of the overall quality of the optical fiber link. The rating value is derived from the excess insertion loss and/or the excess back reflections associated with the optical fiber link. These parameters can be obtained from an overall characterization of the optical fiber link, without necessarily characterizing each and every event along the optical fiber link. The provided method also provides an estimation of the overall quality of the optical fiber link without necessitating user configuration on the number of optical connectors and/or splices along the link, or pass/fail thresholds.

In accordance with another aspect, there is provided an OTDR system for characterizing an optical fiber link, the OTDR system comprising:

an OTDR acquisition device connectable toward an end of the optical fiber link for performing at least one OTDR acquisition toward the optical fiber link, wherein each OTDR acquisition is performed by propagating in the optical fiber link under test, a pulsed test signal and detecting corresponding return light from the optical fiber link representing backscattered and reflected light as a function of distance in the optical fiber link;

a processing unit receiving the OTDR trace and configured to:

from the OTDR acquisition, derive a value of a first excess parameter associated with the optical fiber link under test, in excess of a nominal value of said first parameter associated with a hypothetical optical fiber link having a length corresponding to the total length of the optical fiber link under test, wherein said first parameter consists of a insertion loss or back reflections of the optical fiber link under test.

In this specification, unless otherwise mentioned, word modifiers such as "substantially" and "about" which modify a condition or relationship characteristic of a feature of features of an embodiment, should be understood to mean that the condition or characteristic is defined to within tolerances that are acceptable for proper operation of that embodiment in the context of an application for which it is intended.

Throughout this specification reference is made to optical reflectometric technology and more specifically to OTDR technology. It is noted that optical reflectometric technology is herein meant to encompass all variations of optical reflectometric technology to which the provided method and system may equivalently apply. Examples of such variations include Optical Frequency Domain Reflectometry (OFDR) (e.g., see U.S. Pat. No. 7,515,276 to FROGGATT et al), and coded OTDR technology (see Park et al. "Coded optical time domain reflectometry: principle and applications", Proc. of SPIE Vol. 6781, 678129 (2007)) also referred to as correlation OTDR. Other variations are also meant to be encompassed.

BRIEF DESCRIPTION OF THE DRAWINGS

Further features and exemplary advantages of the present invention will become apparent to the skilled person from the following detailed description, taken in conjunction with the appended drawings, in which.

Figure 1:
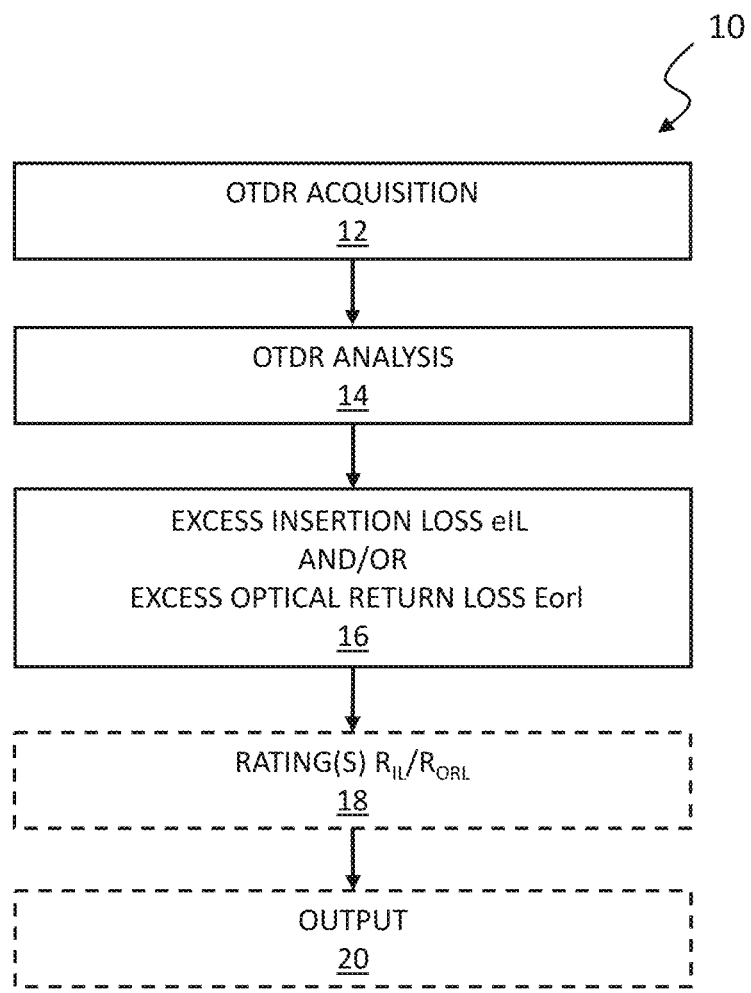
FIG. 1 is a flow chart illustrating an OTDR method for characterizing an optical fiber link, in accordance with one embodiment.

It will be noted that throughout the drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

DETAILED DESCRIPTION

OTDR is a diagnostic technique for optical fiber links where a test signal in the form of light pulses is launched in the optical fiber link under test and the return light signal, arising from backscattering and reflections along the link, is detected. Herein, the process of launching a test signal and acquiring the return light signal to obtain therefrom an OTDR trace is referred to as an "OTDR acquisition". The acquired power level of the return light signal as a function of time is also referred to as an "OTDR trace", wherein the time scale is representative of distance between the OTDR acquisition device and a point along the fiber link.

In the following description, techniques that are generally known to ones skilled in the art of OTDR measurement and OTDR trace processing will not be explained or detailed and in this respect, the reader is referred to available literature in the art. Such techniques that are known may include, e.g., signal processing methods for identifying and characterizing events from an OTDR trace.

Each OTDR acquisition is understood to refer to the actions of propagating a test signal comprising one or more test light pulses having the same pulse width in the optical fiber link, and detecting corresponding return light signal from the optical fiber link as a function of time. A test light-pulse signal travelling along the optical fiber link will return towards its point of origin either through (distributed) backscattering or (discrete) reflections. The acquired power level of the return light signal as a function of time is referred to as the OTDR trace, where the time scale is representative of distance between the OTDR acquisition device and a point along the optical fiber link. Light acquisitions may be repeated with varied pulse widths and/or varied wavelengths to produce an OTDR trace for each acquisition.

One skilled in the art will readily understand that in the context of OTDR methods and systems, each light acquisition generally involves propagating a large number of substantially identical light pulses in the optical fiber link and averaging the results. In this case, the result obtained from averaging will herein be referred to as an OTDR trace. It will also be understood that other factors may need to be controlled during the light acquisitions or from one light acquisition to the next, such as gain settings, pulse power, etc. as is well known to those skilled in the art.

"Backscattering" refers to Rayleigh scattering (RBS) occurring from the interaction of the travelling light with the optical fiber media all along the fiber link, resulting in a generally sloped background light (in logarithmic units, i.e. dB, on the ordinate) on the OTDR trace, whose intensity disappears at the end of the range of the travelling pulse. "Events" along the fiber will generally result in a more localized drop of the backscattered light on the OTDR trace, which is attributable to a localized loss, and/or in a localized reflection peak. It will be understood that an "event" characterized by the OTDR method described herein may be generated by any perturbation along the fiber link which affects the returning light. Typically, an event may be generated by an optical fiber splice along the fiber link, which is characterized by a localized loss with little or no reflection. Mating connectors can also generate events that typically present reflectance, although these may be impossible to detect in some instances. OTDR methods and systems may also provide for the identification of events such as a fiber breakage, characterized by substantial localized loss and, frequently, a concomitant reflection peak, as well as loss resulting from a bend in the fiber. Finally, any other component along the fiber link may also be manifest as an "event" generating localized loss.

Now referring to the drawings, FIG. 1 is a flow chart illustrating an OTDR method 10 for characterizing an optical fiber link under test, in accordance with one embodiment. The OTDR method provides an estimation of the overall quality of the optical fiber link without necessarily characterizing each and every event along the optical fiber link.

In step 12, at least one OTDR acquisition is performed toward the optical fiber link under test. In one embodiment, a single OTDR acquisition is performed using, e.g., preconfigured or predetermined acquisition parameters that are selected to at least cover a given maximum distance and loss range for an optical fiber link (e.g., 40 km and 15 dB). In other embodiments, multiple OTDR acquisitions may be required in order to ensure that the end of link is reached and can be characterized. For example, OTDR acquisitions may be successively launched with increasing pulse widths or averaging time, until it is ascertained that that end of the link is reached. Acquisition parameters may be automatically selected by the OTDR processing unit or be selected by the user.

Of note is that it may be advantageous to minimize the acquisition time. The acquisition time may be reduced by selecting longer pulses (i.e., greater pulse width). Longer pulses increase the level of backscattered signal received from the optical fiber link under test and thereby reduce the required averaging time for a given dynamic range requirement, consequently reducing the acquisition duration.

Optionally, the distance range and loss range to cover may be obtained by performing a preliminary OTDR acquisition used to estimate the link length. This optional step may help to optimize acquisition parameters for the optical fiber link to be tested. For example, an approximate link length can be obtained from a preliminary OTDR acquisition, which may then be used to determine the repetition rate to be applied in subsequent OTDR acquisition(s).

In step 14, an OTDR analysis is conducted from the OTDR acquisition(s) obtained from step 12 in order to derive, in step 16, a value of at least one excess parameter associated with the optical fiber link under test. The excess parameter is defined in excess of a nominal value of the excess parameter which corresponds to a hypothetical optical fiber link having a length corresponding to the total length of the optical fiber link under test. Either or both the excess insertion loss (eIL) or the excess back reflections (eBR) may be derived.

Step 14 may optionally comprise the identification of the end of the optical fiber link, and derive therefrom a measured value of total length of the optical fiber link ($L_{link}$) and a measured value of one or more parameters, e.g. a measured value of total insertion loss ($IL_{link}$) and/or a measured value of total cumulated back reflections ($BR_{link}$).

Although the OTDR acquisition(s) obtained from step 12 may also be used to identify events along the optical fiber link and provide a detailed characterization of the identified events, such an analysis is not required and therefore optional in the context of the OTDR method 10.

Figure 2:
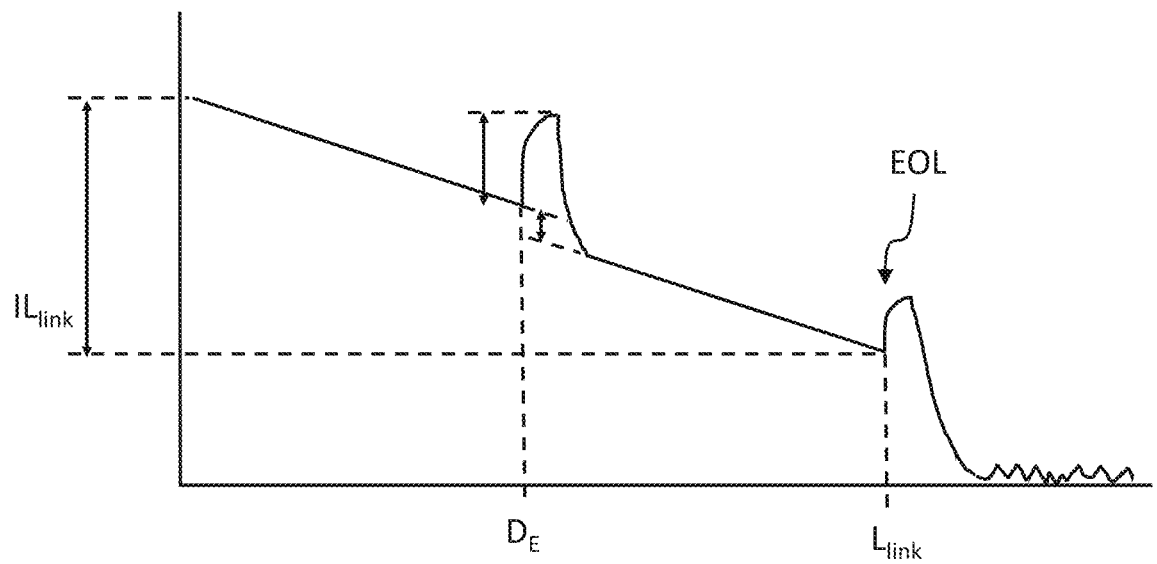
FIG. 2 is a graph illustrating an example of an OTDR acquisition associated with an optical fiber link under test.

Referring to FIG. 2 which shows an example of an OTDR trace obtained from step 12, the OTDR trace how the remote end of the optical fiber link under test (EOL) can be identified by analyzing the OTDR trace. In the embodiment illustrated in FIG. 2, the End Of the optical fiber Link (EOL) is found by identifying a sudden substantial drop at the remote end of the OTDR trace. As shown in FIG. 2, the total length ($L_{link}$) of the optical fiber link may be measured from a location of the end of the optical fiber link in the OTDR trace. The total insertion loss ($IL_{link}$) may be measured as known in the art, from the cumulated insertion loss from the near end up to the remote end of the link under test. The total back reflections ($BR_{link}$) may also be measured as known in the art from the cumulated optical return loss ($ORL_{link}$) from the near end up to the remote end of the link under test (e.g. by a mathematical integration of the OTDR trace), where $BR_{link}=-ORL_{link}$.

It is noted that in other embodiments, launch and/or receive cables may be connected respectively to the near and remote ends of the optical fiber link in order to better characterized input and output connectors. It will be understood that, in this case, an adapted OTDR analysis may identify the launch and receive cables along the OTDR trace and derive therefrom a location of the near end and the remote end of the optical fiber link. The total length ($L_{link}$), the total insertion loss ($IL_{link}$) and the total optical return loss ($BR_{link}=-ORL_{link}$) of optical fiber link (excluding the launch and receive cables) may then be derived as known in the art.

As detailed hereinbelow, in embodiments wherein the excess parameter corresponds to the excess insertion loss (eIL), step 14 may further comprise: identify the end of the optical fiber link, derive therefrom a measured value of total length of the optical fiber link ($L_{link}$) and a measured value of total insertion loss ($IL_{link}$) and derive a value of the excess insertion loss (eIL) by deducting the nominal value of insertion loss ($IL_{nom}$) from the measured value of total insertion loss ($IL_{link}$).

As also detailed hereinbelow, in other embodiments wherein the excess parameter corresponds to the excess back reflections (eBR), step 14 may further comprise: from the OTDR acquisition, calculate the excess back reflections (eBR) by integrating portions of the OTDR acquisition corresponding to reflectance peaks.

Excess Insertion Loss (eIL):

As used herein, a nominal value of insertion loss is "nominal" in the sense that it accounts for intrinsic and/or unavoidable fiber insertion loss but does not include additional and avoidable insertion loss caused for example by poor connectors, poor splices, optical fiber bends, localized optical fiber defects and/or any other excessive optical fiber loss. The nominal value of insertion loss ($IL_{nom}$) at least includes loss induced by the typical intrinsic optical fiber attenuation for the relevant wavelength. The nominal value may further account for a typical number of good splices and connectors that can be expected to be present along an optical fiber link. The nominal value may further account for near-end and remote-end connectors. Consequently, any excess insertion loss relative to the nominal value therefore represents an indicator of the quality of the optical fiber link, including the quality of the optical splices and connectors, the presence of an excessive number of splices or connectors (good or bad) and the presence of bending loss.

In one embodiment, the nominal value of insertion loss is calculated as follows:

$$IL_{nom}=k*L_{link}+C \quad (1)$$

wherein the constant of proportionality k (in dB/km) represents typical intrinsic fiber attenuation for the relevant wavelength and insertion loss caused by a typical number of good splices and connectors that can be expected to be present along an optical fiber link (e.g. 0.23 dB/km @1550); and wherein C (in dB) represents typical insertion loss caused by good or typical near and end connectors (e.g. 1.5 dB).

The excess insertion loss (eIL) corresponds to any insertion loss along the optical fiber link under test, which exceeds from the calculated nominal value of insertion loss:

$$eIL=IL_{link}-IL_{nom} \quad (2)$$

where eIL, $IL_{link}$ and $IL_{nom}$ are expressed on a logarithmic scale (dB).

It will be readily understood that the above derivation of excess insertion loss also applies to OLTS measurements which allow to measure a total insertion loss and a total length of the optical fiber link. The excess insertion loss, as well as the insertion loss rating described hereinbelow therefore apply equivalently to OLTS measurements.

Excess Back Reflections:

As used herein, a nominal value of back reflections is "nominal" in the sense that it accounts for intrinsic and/or unavoidable fiber backscatter but does not include reflectance contributed by discrete reflections due to, e.g., connectors, mechanical splices, optical couplers, etc.

An issue caused by optical return loss or back reflections is not related to the intrinsic fiber Rayleigh backscattering but rather to excess back reflections contributed, e.g., by connectors, especially poor ones and/or located close to the near and/or remote end of the optical fiber link under test. Excess back reflections are representative of the contribution of reflectance to the total cumulated back reflections. Consequently, any excess back reflections relative to the nominal value therefore represents an indicator of the quality of the optical fiber link, including the quality of the optical connectors.

As known in the art, the optical return loss is a measure of the cumulated quantity of light that is reflected along the optical fiber link under test (e.g. by a mathematical integration of the OTDR trace) and is expressed in positive decibels. We herein define the back reflections, expressed in negative decibels, as the opposite (i.e. negative) of the optical return loss such that BR=−ORL.

In one embodiment, a value of excess back reflections (eBR) is derived from the OTDR acquisition using an integration approach. The described integration approach relaxes constraints on spatial resolution for the OTDR acquisition because it does not require to spatially distinguish closely-spaced events such as reflective events. More specifically, events appearing as merged on the OTDR acquisition will not impact the excess back reflections evaluation method. Of note is that the acquisition time may consequently be reduced by selecting longer pulses. Longer pulses increase the level of backscattered signal received from the optical fiber link under test and thereby reduce the required averaging time for a given dynamic range requirement, consequently reducing the acquisition duration. A downside of longer pulses is the lower associated spatial resolution, but when spatial resolution requirements are relaxed, the acquisition time can be reduced. The described OTDR method can therefore be made time-efficient.

The back reflections associated with an optical fiber link $BR_{link}$ can be expressed as the sum, on a linear scale, of the nominal back reflections $BR_{nom}$ originating from the optical fiber Rayleigh backscattering and the excess back reflections eBR originating from discrete reflections typically associated with optical connectors. The link back reflections can be expressed as:

$$10^{BRlink/10} = 10^{BRnom/10} + 10^{eBR/10} \quad (3)$$

where $BR_{link}$, $BR_{nom}$, eBR are expressed in negative decibels.

Figure 3:
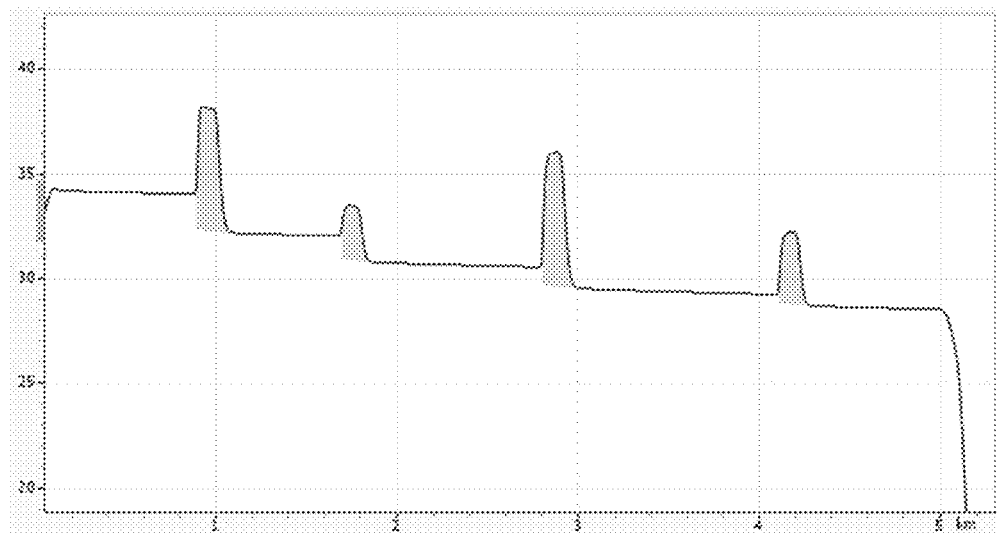
FIG. 3 is a graph illustrating an example of an integration method used to derive an excess back reflections eBR from an OTDR acquisition.

FIG. 3 illustrates an example of an integration method applied to derive the excess back reflections eBR from the OTDR acquisition. The method comprises a first step of identifying reflection peaks on the OTDR acquisition. The second step is to integrate over the reflectance peaks, the power level corresponding to the reflectance contribution, on top of the fiber backscattering level. In FIG. 3, regions that are colored in gray correspond to the reflectance area that is integrated in order to derive the excess back reflections eBR.

It should be noted that although FIGS. 3, 4, 5 and 6 illustrate the OTDR acquisition on a logarithmic scale, the integration should actually be calculated on a linear scale (not shown).

As shown in FIG. 3, the integrated reflectance area (gray area) is cropped below at the power level corresponding to a level of optical fiber backscattering after (i.e., at the output) of the reflective event, in order to account for the fact that the connection loss that generates a drop in the fiber backscattering level is fundamentally located just before the reflectance peak (although not visible on the OTDR trace because it is hidden by the reflectance peak).

Figure 4:
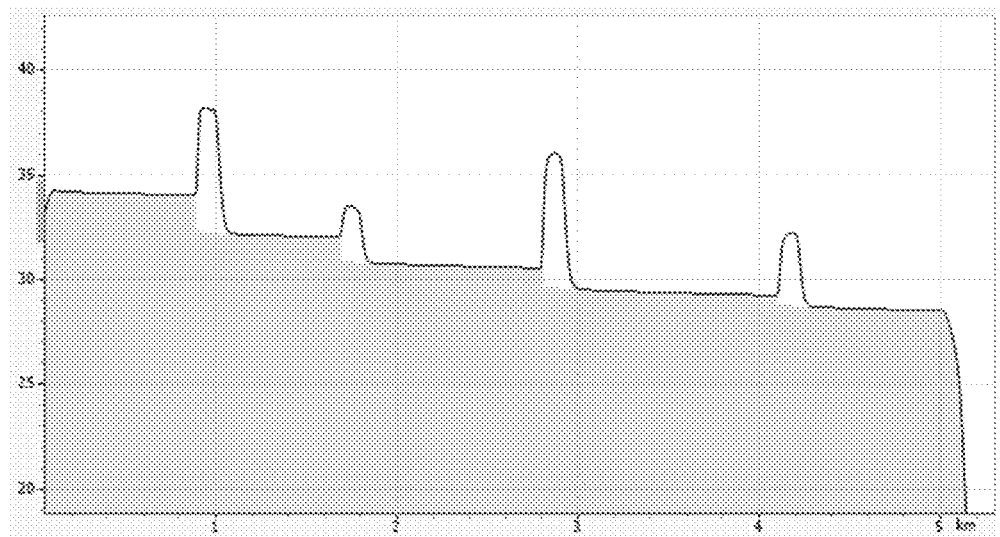
FIG. 4 is a graph illustrating an example of an integration method used to derive a nominal back reflections $eBR_{nom}$ from an OTDR acquisition.

FIG. 4 illustrates an example of the integration method applied to derive the nominal back reflections $BR_{nom}$ from the OTDR acquisition. In this case, the integration is performed over the area that is complementary of the above reflectance area, which represents power corresponding to the fiber backscattering. In FIG. 4, the area that is colored in gray is integrated in order to derive the nominal back reflections $BR_{nom}$.

The total back reflections $BR_{link}$ may be derived by integrating the whole OTDR acquisition.

It will be readily understood that the excess back reflections eBR can be integrated directly (as in FIG. 3) or can be derived by deducting the nominal back reflections $BR_{nom}$ from the total back reflections $BR_{link}$, as obtained from integration.

Figure 5:
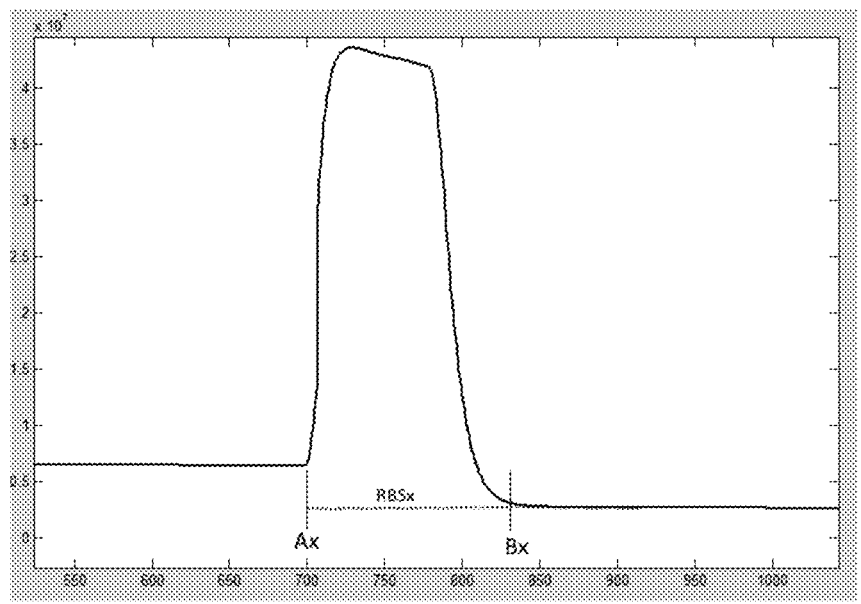
FIG. 5 is a graph scaled to show one reflective event of the graph of FIG. 3.

Referring to FIG. 5 which shows a zoom-in on one reflective event of the graph of FIG. 3, in one embodiment, the excess back reflections eBR as seen from near end (forward direction) may be derived as follows:

1—Compute the Excess Back Reflections for Each Individual Reflectance Peak x:

$$IRx = \Sigma_{i=Ax}^{Bx}(\text{Trace}(i) - RBS_x(i)) \quad (4)$$

where
IRx: Reflectance peak integration for reflectance peak x;
Ax: Index corresponding to beginning of reflectance peak x;
Bx: Index corresponding to the end of reflectance peak x;
Trace: OTDR acquisition trace, on a linear scale;
RBSx: Fiber RBS level, on a linear scale, as extrapolated over indexes Ax to Bx, from the fiber segment following reflectance peak x;

2—Derive the Excess Back Reflections Vorresponding to all Reflectance Peaks:

$$IR_{tot} = \Sigma_{x=1}^{n} IR_x \quad (5)$$

where n is the number of reflectance peaks and $IR_{tot}$ is the integration value corresponding to the sum of all reflectance peaks.

Then the excess back reflections eBR as normalized for an arbitrary pulse width of 1 ns is derived:

$$eBR = 10 \times \log\left(\frac{IR_{tot}}{REF} \times \frac{SP}{1 \text{ ns}}\right) + FiberRBS \quad (6)$$

where
REF: Reference RBS power level at the near end of the optical fiber link or launch cord;
SP: Sampling period (time between trace samples) corresponding to the OTDR acquisition;
FiberRBS: Rayleigh backscattering coefficient of the fiber (in dB) for an arbitrary 1 ns pulse width.

Figure 6:
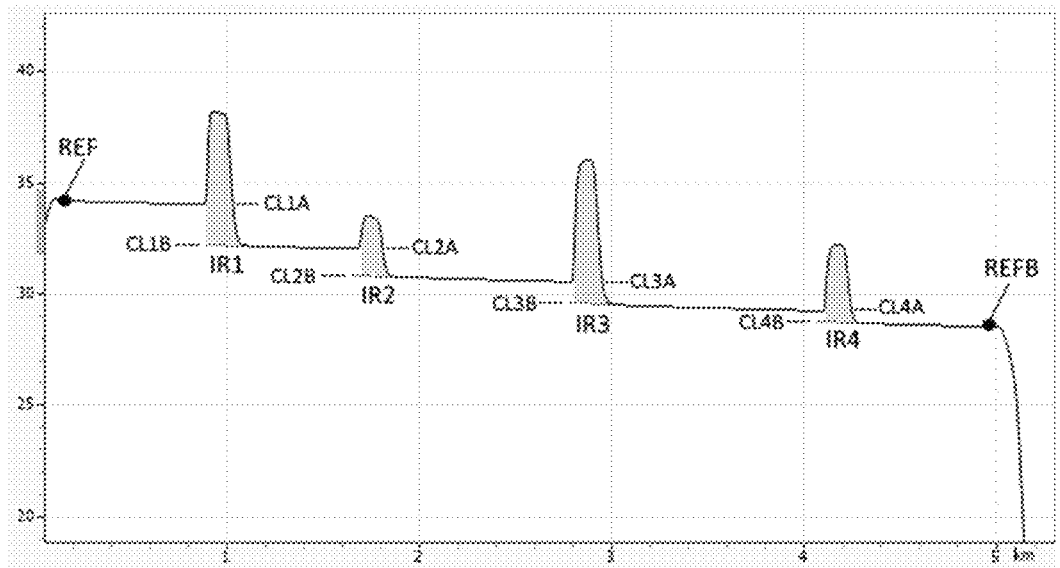
FIG. 6 is a graph illustrating an example of an integration method used to derive a backward excess back reflections $eBR_{back}$ from an OTDR acquisition.

Now referring to FIG. 6, optionally, the excess back reflections $eBR_{back}$ as seen from the far end (backward direction) may be derived as follows:

1—Compute the Normalized Reflectance Peak Integration for Backward Direction (IRB) Using Forward and Backward Cumulative Loss:

$$IRB_x = \frac{IR_x}{10^{\frac{CLnB-REFB}{10}}} \times 10^{\frac{REF-CLnA}{10}} \quad (7)$$

IRBx: Reflectance peak integration for reflectance peak x as seen from the far end;
IRx: Reflectance peak integration for reflectance peak x;

CLxA: Trace level at input of reflectance peak x (i.e., Trace(Ax));
CLxB: RBS slope after peak x, as extrapolated to index Ax;
REF: Reference RBS power level at the near end of the optical fiber link or launch cord;
REFB: Reference RBS power level at far end of the optical fiber link or receive cord.

2—Derive the Excess Back Reflections $eBR_{back}$ Corresponding to all Reflectance Peaks as Seen from the Far End:

$$IRB_{tot} = \Sum_{x=1}^{n} = IRB_x \qquad (8)$$

where n is the number of reflectance peaks and $IRB_{tot}$ is the integration value corresponding to the sum of all reflectance peaks.

Then the excess back reflections $eBR_{back}$ as normalized for an arbitrary pulse width of 1 ns is derived:

$$eBR_{back} = 10 \times \log\left(\frac{IRB_{tot}}{REF} \times \frac{SP}{1\ ns}\right) + FiberRbs \qquad (9)$$

where REF is the reference RBS power level at the near end of the optical fiber link or launch cord;

In embodiments where the excess back reflections $eBR_{back}$ as seen from the far end (backward direction) is derived, the overall excess back reflections may be set as the worst value among the forward excess back reflections eBR and the backward excess back reflections $eBR_{back}$. The worst value corresponding to the highest value of BR when expressed in negative decibels. Alternatively, the overall excess back reflections may be derived as the average value among the forward excess back reflections eBR and the backward excess back reflections $eBR_{back}$, or any other relation that may be deemed appropriate.

Rating Value

Back to FIG. 1, in step 18, one or more rating values associated with the optical fiber link under test may optionally be derived from values of excess insertion loss and/or excess back reflections as derived in step 16. For example, an insertion loss rating and/or a back reflections rating may be derived or a global rating that accounts for both insertion loss and back reflections may be derived.

The rating may be embodied as a position assigned on a predefined scale and which represents an appreciation of the overall quality of the optical fiber link. The scale may be multi-level (e.g., a five-star rating from 0 to 5 stars; or a letter rating from A to E) or linear (e.g., a percentage value from 0 to 100%).

In other embodiments, one or more binary pass/fail values associated with the optical fiber link under test may optionally be derived from values of excess insertion loss and/or excess back reflections as derived in step 16.

Insertion Loss Rating:

In one embodiment, an insertion loss quality of the optical fiber link may be represented by an excess insertion loss rating value $R_{IL}$ derived from the excess insertion loss eIL. For example, in a linearly scaled rating between 0 to 100% where 80% represent a target of 0 dB and every additional 1.5 dB of excess insertion loss is worth −20%, the insertion loss rating may be calculated as follows:

$$R_{IL} = 80 - 20 * eIL/1.5\ dB \qquad (10)$$

where the results are then restrained to a lower limit of 0 and a higher limit of 100%.

| eIL (dB) | $R_{IL}$ |
|---|---|
| −1.5 or less | 100% |
| 0 | 80% |
| 1.5 | 60% |
| 3 | 40% |
| 4.5 | 20% |
| 6 or more | 0% |

Such a linearly scaled rating may also be used to derive a 5-star rating or ranges of excess insertion loss be directly assigned to 5-star rating values, i.e. a number of stars between 0 and 5:

| eIL (dB) | $R_{IL}$ | Nb of stars |
|---|---|---|
| 0 or less | 80% or more | 5 |
| 0 to 1.5 | 60-80% | 4 |
| 1.5 to 3 | 40-60% | 3 |
| 3 to 4.5 | 20-40% | 2 |
| 4.5 to 6 | 0-20% | 1 |
| 6 or more | 0% or less | 0 |

Insertion Loss Binary Pass/Fail Threshold:

In another embodiment, an insertion loss quality of the optical fiber link may be represented by an excess insertion loss binary pass/fail value $PF_{IL}$ derived from the excess insertion loss eIL. For example, a threshold may be set at 1 dB or 2 dB of excess insertion loss such that any excess insertion loss that is greater than the threshold represents a FAIL value and any excess insertion loss that is less than or equal to the threshold represents a PASS value.

| eIL (dB) | $PF_{IL}$ |
|---|---|
| ≤2 | PASS |
| >2 | FAIL |

Back Reflections Rating:

In one embodiment, a back reflections quality of the optical fiber link may be represented by an excess back reflection rating value RBR derived from the excess back reflections eBR. For example, in a linearly scaled rating between 0 to 100% where 80% represent a target of −50 dB and every additional 10 dB of excess back reflections is worth −20%, the back reflections rating may be calculated as follows:

$$R_{BR} = 80 - 20 * (eBR - -50\ dB)/10\ dB \qquad (11)$$

where the results are then restrained to a lower limit of 0 and a higher limit of 100%.

| eBR (dB) | $R_{BR}$ |
|---|---|
| −60 or less | 100% |
| −50 | 80% |
| −40 | 60% |
| −30 | 40% |
| −20 | 20% |
| −10 or more | 0% |

Such a linearly scaled rating may also be used to derive a 5-star rating or ranges of excess back reflections be directly assigned to 5-star rating values, i.e. a number of stars between 0 and 5:

| eBR (dB)   | $R_{BR}$    | Nb of stars |
|------------|-------------|-------------|
| −50 or less | 80% or more | 5           |
| −50 to −40 | 60-80%      | 4           |
| −40 to −30 | 40-60%      | 3           |
| −30 to −20 | 20-40%      | 2           |
| −20 to −10 | 0-20%       | 1           |
| −10 or more | 0% or less | 0           |

Back Reflections Pass/Fail Threshold:

In another embodiment, a back reflections quality of the optical fiber link may be represented by an excess back reflection pass/fail value $PF_{BR}$ derived from the excess back reflections eBR. For example, a threshold may be set at −30 dB or −20 dB of excess back reflections such that excess back reflections that are greater than the threshold represent a FAIL value and back reflections that are less than or equal to the threshold represent a PASS value.

Global Rating:

A global rating value R that accounts for both excess insertion loss and excess back reflections may further be derived, for example as either the average or the minimum of the excess insertion loss rating value $R_{IL}$ and the excess back reflections rating value $R_{BR}$:

$$R = \min(R_{IL}, R_{BR}); \text{ or} \tag{12}$$

$$R = \text{average}(R_{IL}, R_{BR}) \tag{13}$$

It will be understood that, ultimately, the one or more rating values are derived at least from the value of excess insertion loss eIL or the value of excess back reflections eBR associated with the optical fiber link. Step 16 may therefore be considered as an intermediate step to step 18. Step 18 may also derive rating value(s) without necessarily directly calculating values of nominal or excess insertion loss and/or back reflections, e.g.:

$$R_{IL} = 80 - 20 * (IL_{link} - k*L_{link} + C)/1.5 \text{ dB} \tag{14}$$

In step 20, values derived in steps 16 and/or 18 may be output to a user.

Similarly, a global pass/fail value PF that accounts for both excess insertion loss and excess back reflections may further be derived. For example, if any of the insertion loss pass/fail value $PF_{IL}$ or the back reflections pass/fail value $PF_{BR}$ is FAIL, the global pass/fail value PF is also FAIL.

Figure 7A:
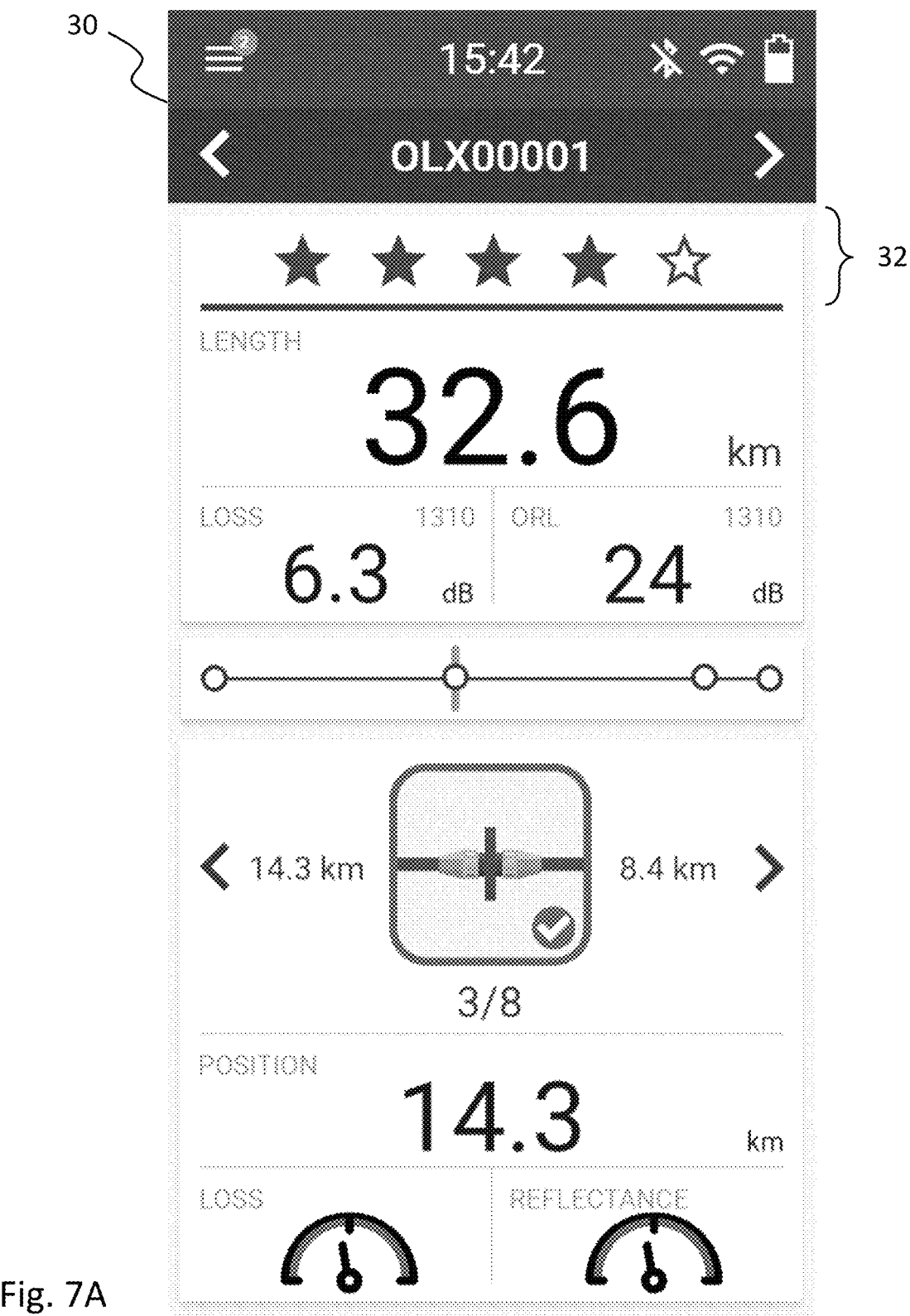
FIG. 7A is a screenshot illustrating an example of a display of an OTDR acquisition device, which displays a global rating value associated with an optical fiber link under test, in the form of a 5-star rating display.

FIG. 7A shows an example of a display 30 of an OTDR acquisition device, which displays a global rating value associated with an optical fiber link under test, in the form of a 5-star rating display 32. In the illustrated case, the global rating value R on the 5-star scale is 4 stars.

In other embodiments, the rating may be displayed on screen as a percentage value or any other linear or multi-level scale.

Figure 7B:
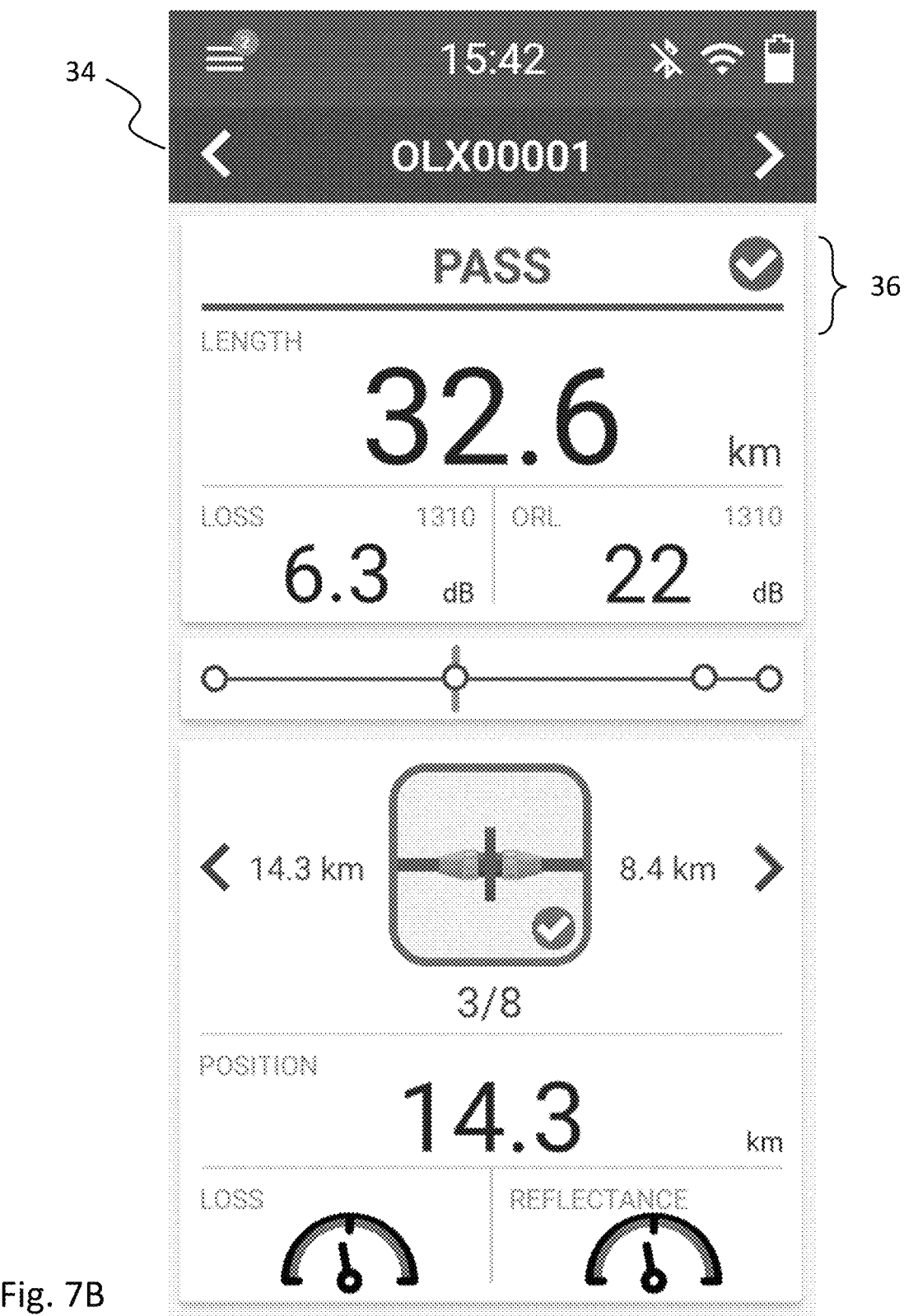
FIG. 7B is a screenshot illustrating an example of a display of an OTDR acquisition device, which displays a global binary pass/fail value associated with an optical fiber link under test, in the form of a pass/fail display.

FIG. 7B shows another embodiment of a display 35 of an OTDR acquisition device, which displays a global binary pass/fail value associated with an optical fiber link under test, in the form of a pass/fail display 34. In the illustrated case, the global pass/fail value PF is PASS.

Figure 8:
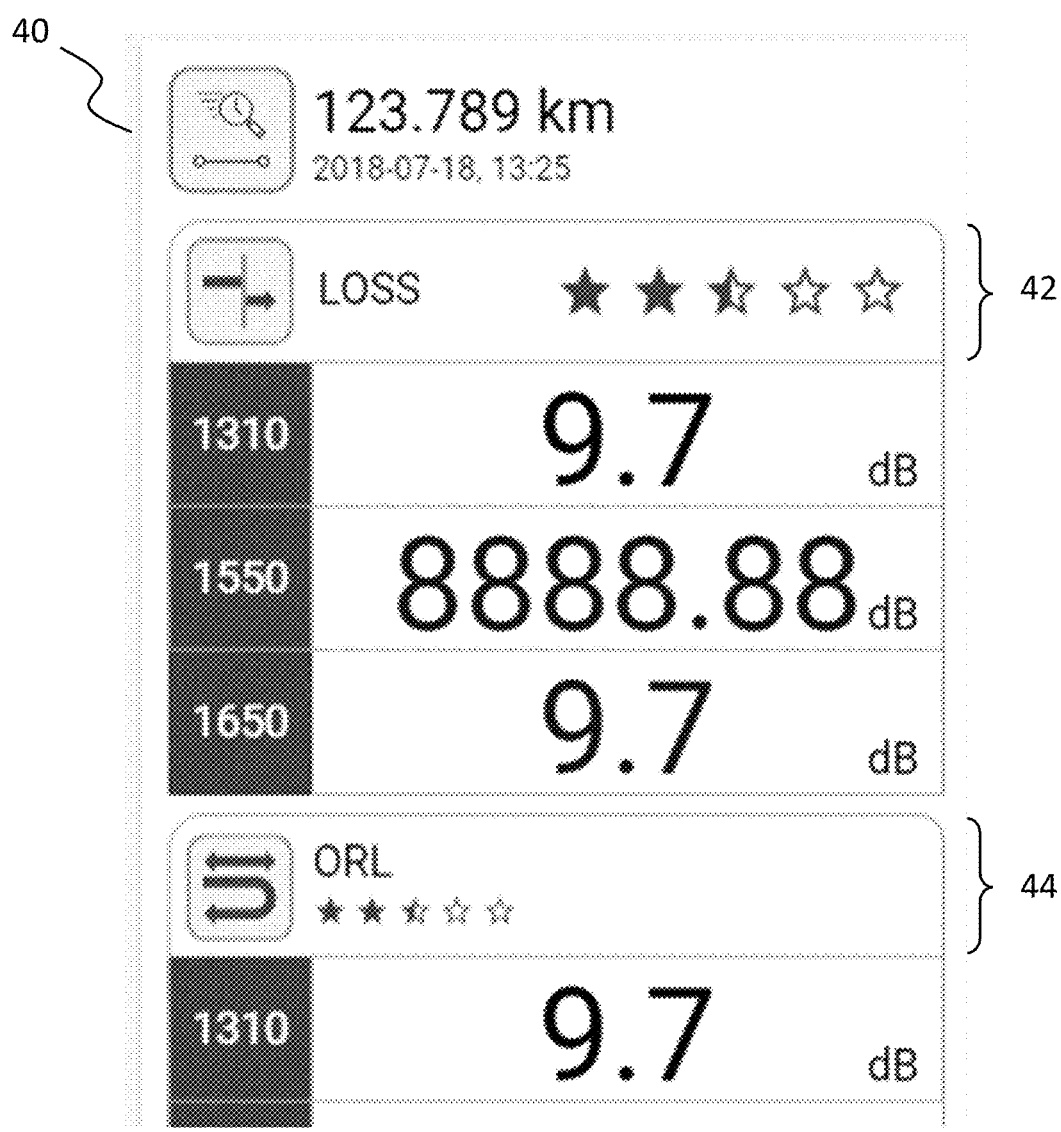
FIG. 8 is a screenshot illustrating another example of a display of an OTDR acquisition device, wherein individual values of excess insertion loss rating $R_{IL}$ and of excess back reflections rating $R_{BR}$ are displayed in the form of 5-star rating displays.

FIG. 8 show an example of a display 40 of an OTDR acquisition device wherein distinct values of excess insertion loss rating $R_{IL}$ and of excess back reflections rating $R_{BR}$ can be displayed either alternatively or complementarily to the global rating value R, in the form of 5-star rating displays 42 and 44.

It will be understood that, in some embodiments, individual events along the optical fiber link under test may optionally be characterized in terms of insertion loss and reflectance. An event rating value $R_E$ or an event binary pass/fail value $PF_E$ may then further be derived for each event individually and output to the user via a display.

Connector Insertion Loss Rating:

In one embodiment, an insertion loss quality of an individual connector event may be represented by a connector insertion loss rating value $R_{C\_IL}$ derived from the event insertion loss $IL_C$. For example, in a linearly scaled rating between 0 to 100% where 80% represent a target of 0.5 dB and every additional 0.25 dB of insertion loss is worth −20%, the connector insertion loss rating may be calculated as follows:

$$R_{C\_IL} = 80 - 20*(IL_C - 0.5)/0.25 \text{ dB} \tag{15}$$

Connector Reflectance Rating:

In one embodiment, a reflectance quality of an individual connector event may be represented by a connector reflectance rating value $R_{C\_R}$ derived from the event reflectance $R_C$. For example, in a linearly scaled rating between 0 to 100% where 80% represent a target of −55 dB and every additional 10 dB of reflectance is worth −20%, the connector reflectance rating may be calculated as follows:

$$R_{C\_R} = 80 - 20*(Rc - -55 \text{ dB})/10 \text{ dB} \tag{16}$$

Splice Loss Rating

In one embodiment, an insertion loss quality of an individual splice event may be represented by a splice insertion loss rating value $R_{S\_IL}$ derived from the event insertion loss $IL_S$. For example, in a linearly scaled rating between 0 to 100% where 80% represent a target of 0.15 dB and every additional 0.15 dB of insertion loss is worth −20%, the splice insertion loss rating may be calculated as follows:

$$R_{S\_IL} = 80 - 20*(IL_S - 0.15 \text{dB})/0.15 \text{ dB} \tag{17}$$

In the case of connectors, an event rating value $R_E$ may then be derived to account for both insertion loss and reflectance, for example as either the average or the minimum of the event insertion loss rating value $R_{C\_IL}$ and the event reflectance rating value $R_{C\_R}$:

$$R_E = \min(R_{C\_IL}, R_{C\_R}) \text{ or} \tag{18}$$

$$R_E = \text{average}(R_{C\_IL}, R_{C\_R}) \tag{19}$$

Insertion Loss and Reflectance Pass/Fail Thresholds:

In another embodiment, an insertion loss quality of an individual connector event may be represented by a connector insertion loss binary pass/fail value $PF_{C\_IL}$ derived from the event insertion loss $IL_C$, and an insertion loss quality of an individual splice event may be represented by a splice insertion loss binary pass/fail value $PF_{S\_IL}$ derived from the event insertion loss $IL_S$. For example, a connector insertion loss and splice loss threshold may be set at 1 dB such that any connector loss or splice loss greater than the threshold represents a FAIL value.

Similarly, a reflectance quality of an individual connector event may be represented by a connector reflectance binary pass/fail value $PF_{C\_R}$ derived from the event reflectance $R_C$.

Global Rating:

A global rating value R that accounts for the excess insertion loss, the excess back reflections, insertion loss values of events and/or reflectance values of events may further be derived, for example as the overall minimum of the excess insertion loss rating value $R_{IL}$, the excess back reflections rating value $R_{BR}$, the event insertion loss rating values $R_{E\_ILi}$ and the event reflectance rating values $R_{E\_Ri}$:

$$R = \min(R_{IL}, R_{BR}, R_{E\_ILi}, R_{E\_Ri}) \tag{20}$$

where i=1 to m m: number of identified events;

$R_{E\_ILi}$: insertion loss rating value for event i;

$R_{E\_Ri}$: reflectance rating value for event i.

Again, alternatively, the global rating value R may be derived as the average of all ratings or any other relation that may be deemed appropriate.

Of course, other embodiments can be envisaged including, for example, a global rating value R derived to account for insertion loss aspects only, e.g., as the overall minimum of the excess insertion loss rating value $R_{IL}$ and the event insertion loss rating values $R_{E\_ILi}$:

$$R = \min(R_{IL}; R_{E\_ILi}) \quad (21)$$

where i=1 to m.

Furthermore, in another embodiment, a global binary pass/fail value PF may be derived as the worst of all derived binary pass/fail values such that the global pass/fail value is FAIL if the excess insertion loss pass/fail value $PF_{IL}$, the excess back reflections pass/fail value $PF_{BR}$, any event insertion loss pass/fail value or any event reflectance pass/fail value is FAIL. Or a global binary pass/fail value PF may be derived as the worst of insertion loss binary pass/fail values such that the global pass/fail value is FAIL if the excess insertion loss pass/fail value $PF_{IL}$ or any event insertion loss pass/fail value is FAIL.

Figure 9:
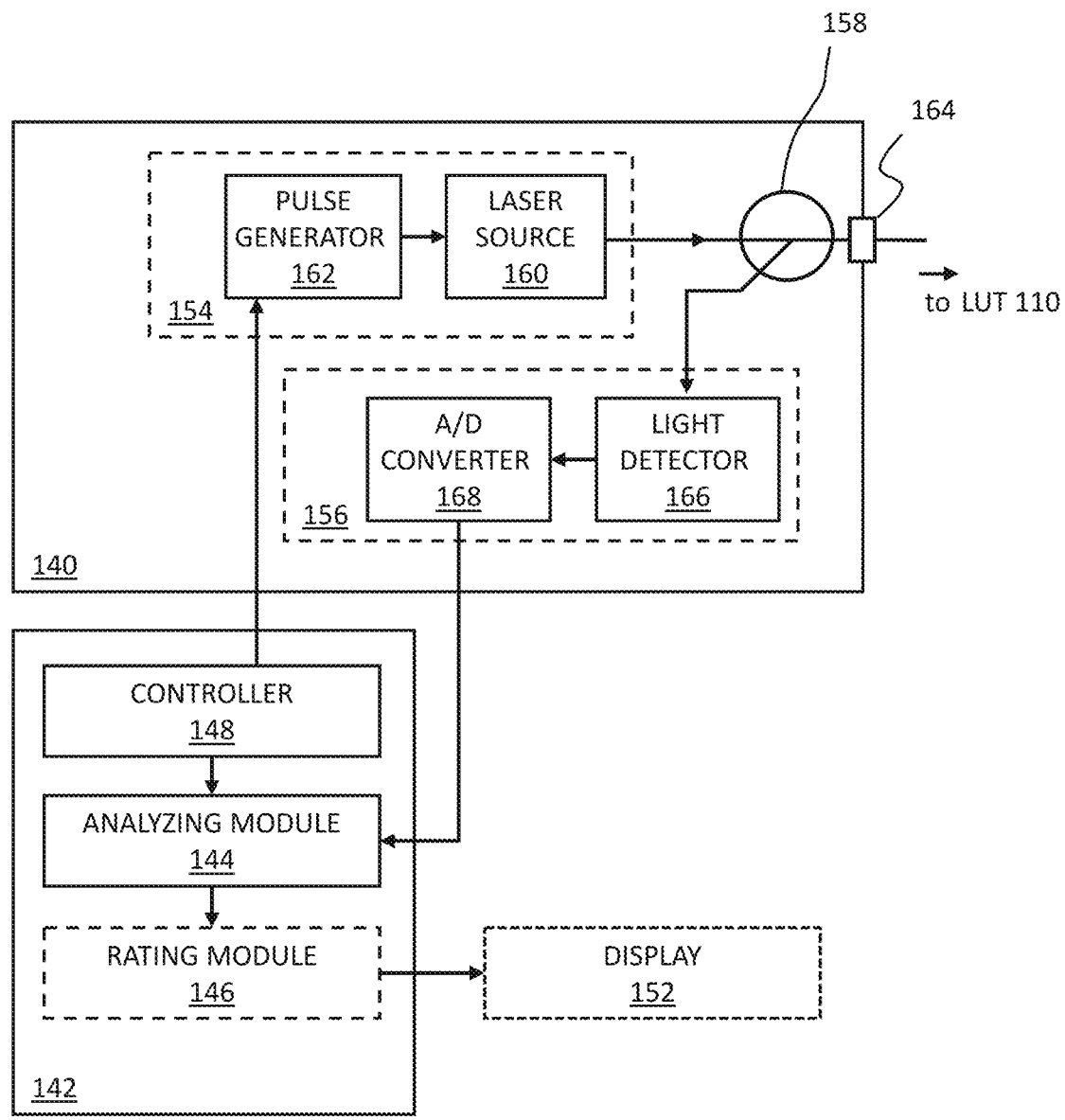
FIG. 9 is a block diagram showing an OTDR device for implementing the method of FIG. 1, in accordance with one embodiment.

FIG. 9 shows an embodiment of an OTDR device 100 for use in the OTDR method of FIG. 1 to characterize an optical fiber link 110.

The OTDR device 100 comprises an OTDR acquisition device 140 connectable toward the tested optical fiber link 110 via an output interface 164, for performing OTDR acquisitions toward the optical fiber link 110. The OTDR acquisition device 140 comprises conventional optical hardware and electronics as known in the art for performing OTDR acquisitions on an optical fiber link.

The OTDR device 110 further comprises at least one processing unit 142 configured to analyze OTDR traces obtained by the OTDR acquisition device 140 to characterize the optical fiber link under test 110. The at least one processing unit 142 may comprise one or more processors.

The processing unit 142 may embody an analyzing module 144 configured for deriving, from the OTDR acquisition, a value of an excess insertion loss and/or an excess back reflections associated with the optical fiber link under test relative to a nominal value of insertion loss and/or back reflections associated with a hypothetical optical fiber link segment having a length corresponding to the total length of the optical fiber link under test. In one embodiment, the analyzing module 114 may be configured to perform steps 14 and 16 of the method of FIG. 1.

The processing unit 142 may further embody a rating module 146 configured to derive a rating value associated with the optical fiber link 110, at least from the derived excess insertion loss and/or the derived excess back reflections. In one embodiment, the rating module performs step 18 of the method of FIG. 1.

The OTDR device 110 further comprises a display 152 to output to a user at least one of the values derived by the analyzing module 144 and/or the rating module 142.

The analyzing module 144, the rating module 146 and the display 152 may be made integral, partially external or totally external to the OTDR acquisition device 140.

The OTDR acquisition device 140 comprises a light generating assembly 154, a detection assembly 156 and a directional coupler 158.

The light generating assembly 154 is embodied by a laser 160 driven by a pulse generator 162 to generate the test signal comprising test light pulses having desired characteristics. As known in the art, the light generating assembly 154 is adapted to generate test light pulses of varied pulse widths, repetition periods and optical power through a proper control of the pattern produced by the pulse generator 162. One skilled in the art will understand that it may be beneficial or required by the application to perform OTDR measurements at various different wavelengths. For this purpose, in some embodiments, the light generating assembly 154 is adapted to generate test light pulses having varied wavelengths by employing a laser 160 that is tunable for example. It will be understood that the light generating assembly 154 may combine both pulse width and wavelength controlling capabilities. Of course, different and/or additional components may be provided in the light generating assembly, such as modulators, lenses, mirrors, optical filters, wavelength selectors and the like.

The light generating assembly 154 is coupled to the output interface 164 of the OTDR acquisition device 140 through a directional coupler 158, such as a circulator, having three or more ports. The first port is connected to the light generating assembly 154 to receive the test light pulses therefrom. The second port is connected toward the output interface 164. The third port is connected to the detecting assembly 156. The connections are such that test light pulses generated by the light generating assembly 154 are coupled to the output interface 164 and that the return light signal arising from backscattering and reflections along the optical fiber link 110 is coupled to the detection assembly 156.

The detection assembly 156 comprises a light detector 166, such as a photodiode, an avalanche photodiode or any other suitable photodetector, which detects the return light signal corresponding to each test light pulse, and a converter 168 to convert the electrical signal proportional to the detected return light signal from analog to digital in order to allow processing by the processing unit 142. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 140 may also be used to perform multiple acquisitions with varied pulse widths to obtain a multi-pulsewidth OTDR measurement. The thereby obtained OTDR traces will be typically stored in memory (not shown) for further processing. In one embodiment, the OTDR acquisition device 140 performs step 10 of the method of FIG. 1 described hereinabove.

The OTDR traces acquired from the optical fiber link 110 are received and analyzed by the processing unit 142.

Example of OTDR Device Architecture

Figure 10:
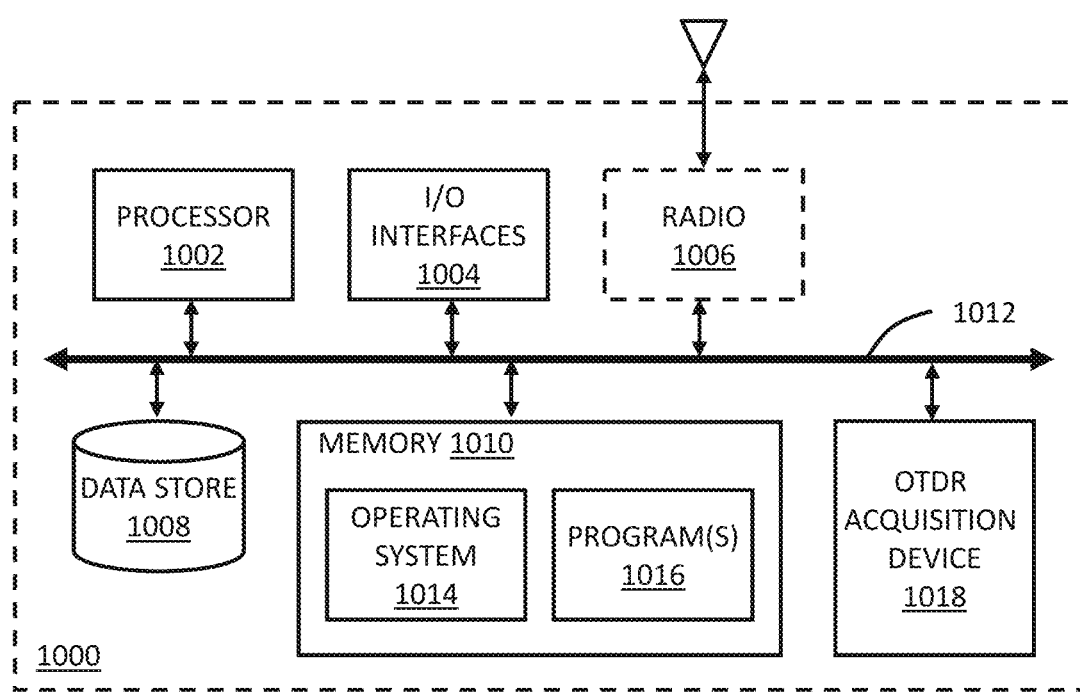
FIG. 10 is a block diagram illustrating in more details the OTDR device of FIG. 9.

FIG. 10 is a block diagram of an OTDR device 1000 which may embody the OTDR method of FIG. 1. The OTDR device 1000 may comprise a digital device that, in terms of hardware architecture, generally includes a processor 1002, input/output (I/O) interfaces 1004, an optional radio 1006, a data store 1008, a memory 1010, as well as an optical test device including an OTDR acquisition device 1018. It should be appreciated by those of ordinary skill in the art that FIG. 10 depicts the OTDR device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the OTDR device 1000 is in operation, the processor 1002 is configured to execute software stored within the memory 1010, to communicate data to and from the memory 1010, and to generally control operations of the OTDR device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the OTDR device 1000.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 10, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the OTDR device 1000. For example, example programs 1016 may include a web browser to connect with a server for transferring OTDR measurement data files, a dedicated OTDR application software configured to determine OTDR acquisitions by the OTDR acquisition device 1018, set OTDR acquisition parameters, analyze OTDR traces obtained by the OTDR acquisition device 1018 and display a GUI related to the OTDR device 1000. For example, the dedicated OTDR application and/or program(s) 1016 may embody the OTDR analysis module 114, configured to analyze acquired OTDR traces in order to characterize the optical fiber link under test, and produce OTDR measurement data files, and a rating module 146 for deriving a rating value associated with the optical fiber link 110, at least from the derived excess insertion loss and/or the derived excess back reflections.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the OTDR device 1000 via the radio 106. In such cases, at least some of the programs 1016 may be located in a memory of such a mobile device, for execution by a processor of the physically distinct device. The mobile may then also include a radio and be used to transfer OTDR measurement data files toward a remote test application residing, e.g., on a server.

It should be noted that the OTDR device shown in FIG. 10 is meant as an illustrative example only. Numerous types of computer systems are available and can be used to implement the OTDR device.

Example of OTDR Acquisition Device Architecture

Figure 11:
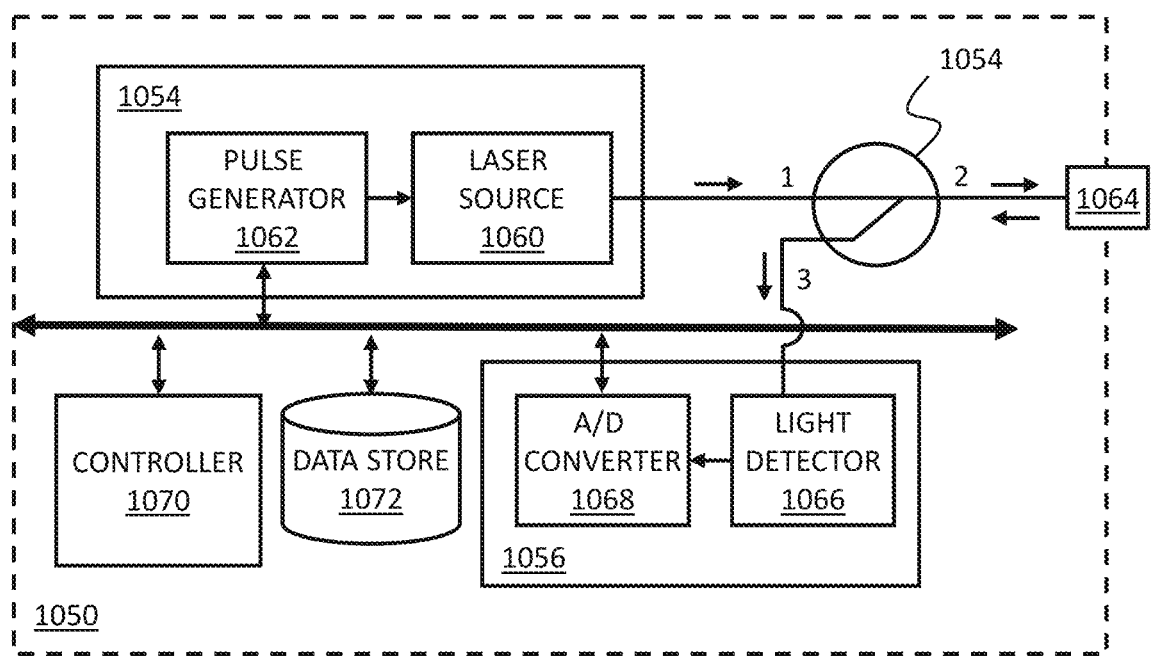
FIG. 11 is a block diagram illustrating an example embodiment of an OTDR acquisition device of the OTDR device of FIG. 10.

FIG. 11 is a block diagram an embodiment of an OTDR acquisition device 1050 which may embody the OTDR acquisition device 1018 of the OTDR device 1000 of FIG. 10.

The OTDR acquisition device 1050 is connectable toward the tested optical fiber link via an output interface 1064, for performing OTDR acquisitions toward the optical fiber link. The OTDR acquisition device 1050 comprises conventional optical hardware and electronics as known in the art for performing OTDR acquisitions over an optical fiber link.

The OTDR acquisition device 1050 comprises a light generating assembly 1054, a detection assembly 1056, a directional coupler 1058, as well as a controller 1070 and a data store 1072.

The light generating assembly 1054 is embodied by a laser source 1060 driven by a pulse generator 1062 to generate the OTDR test signal comprising test light pulses having desired characteristics. As known in the art, the light generating assembly 1054 is adapted to generate test light pulses of varied pulse widths, repetition periods and optical power through a proper control of the pattern produced by the pulse generator 1062. One skilled in the art will understand that it may be beneficial or required by the application to perform OTDR measurements at various different wavelengths. For this purpose, in some embodiments, the light generating assembly 1054 is adapted to generate test light pulses having varied wavelengths by employing a laser source 1060 that is tunable for example. It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1050 through a directional coupler 1058, such as a circulator, having three or more ports. The first port is connected to the light generating assembly 1054 to receive the test light pulses therefrom. The second port is connected toward the output interface 1064. The third port is connected to the detection assembly 1056. The connections are such that test light pulses generated by the light generating assembly 1054 are coupled to the output interface 1064 and that the return light signal arising from backscattering and reflections along the optical fiber link 110 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 1050 may also be used to perform multiple acquisitions with varied pulse widths to obtain a multi-pulsewidth OTDR measurement.

The OTDR acquisition device 1050, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the OTDR acquisition device 1050 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 1016.

The data store 1072 may be used to cumulate raw data received from the detection assembly 1056, as well as intermediary averaged results and resulting OTDR traces.

The data store 908 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1050 may be received and analyzed by one or more of the computer programs 1016 or 816 and/or stored in data store 1008 for further processing.

It should be noted that the architecture of the OTDR acquisition device 1050 as shown in FIG. 11 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The embodiments described above are intended to be exemplary only. The scope of the invention is therefore intended to be limited solely by the appended claims.

The invention claimed is:

1. A method for characterizing an optical fiber link under test, the method comprising:

performing at least one OTDR acquisition toward the optical fiber link, wherein the OTDR acquisition comprises propagating in the optical fiber link under test, a pulsed test signal and detecting corresponding return light from the optical fiber link representing backscattered and reflected light as a function of distance in the optical fiber link; and from the OTDR acquisition, deriving a value of an excess insertion loss associated with the optical fiber link under test, in excess of a nominal value of insertion loss associated with a hypothetical optical fiber link having a length corresponding to the total length of the optical fiber link under test.

2. The method as claimed in claim 1, further comprising:
from the OTDR acquisition, deriving a measured value of total length of said optical fiber link and a measured value of insertion loss associated with the optical fiber link under test.

calculating a nominal value of insertion loss associated with said hypothetical optical fiber link having a length corresponding to the measured value of total length; and deriving said value of said excess insertion loss associated with the optical fiber link under test by deducting the nominal value of insertion loss from the measured value of insertion loss.

3. The method as claimed in claim 2, wherein the nominal value is calculated at least from the measured value of total length and a value of at least one constant of proportionality.

4. The method as claimed in claim 3, further comprising:
deriving a rating value associated with the optical fiber link, at least from the derived value of excess insertion loss; and
outputting said rating value.

5. The method as claimed in claim 3, further comprising:
deriving a binary pass/fail value associated with the optical fiber link, at least from the derived value of excess insertion loss; and
outputting said binary pass/fail value.

6. The method as claimed in claim 1, further comprising deriving a value of excess back reflections associated with the optical fiber link under test, in excess of a nominal value of back reflections associated with a hypothetical optical fiber link having a length corresponding to the total length of the optical fiber link under test.

7. The method as claimed in claim 6, wherein deriving a value of excess back reflections comprises:
from the OTDR acquisition, calculating the excess back reflections by integrating portions of the OTDR acquisition corresponding to reflectance peaks.

8. The method as claimed in claim 7, further comprising:
deriving a value of backward-direction excess back reflections;
deriving a rating value associated with the optical fiber link, at least from a maximum of the derived value of excess back reflections and the derived value of backward-direction excess back reflections; and
outputting said rating value.

9. The method as claimed in claim 6, further comprising deriving a first rating value associated with the optical fiber link from the derived value of excess insertion loss and deriving a second rating value associated with the optical fiber link from the derived value of excess back reflections.

10. The method as claimed in claim 9, further comprising deriving a global rating value associated with the optical fiber link as the weakest of the first rating value and the second rating value.

11. The method as claimed in claim 1, further comprising:
deriving a first binary pass/fail value associated with the optical fiber link from the derived value of excess insertion loss;
identifying at least one event along the optical fiber link from the at least one OTDR acquisition and deriving a measured value of insertion loss associated with the identified event;
deriving a second binary pass/fail value associated with the identified event, at least from the measured value of insertion loss associated with the identified event; and
deriving a global binary pass/fail value associated with the optical fiber link at least from a combination of the first binary pass/fail value and the second binary pass/fail value.

12. The method as claimed in claim 1, further comprising:
deriving a first rating value associated with the optical fiber link from the derived value of excess insertion loss;
identifying at least one event along the optical fiber link from the at least one OTDR acquisition and deriving a measured value of insertion loss associated with the identified event;
deriving a second rating value associated with the identified event, at least from the measured value of insertion loss associated with the identified event; and
deriving a global rating value associated with the optical fiber link at least from a combination of the first rating value and the second rating value.

13. A method for characterizing an optical fiber link, the method comprising:
performing at least one OTDR acquisition toward the optical fiber link, wherein the OTDR acquisition comprises propagating in the optical fiber link under test, a pulsed test signal and detecting corresponding return light from the optical fiber link representing backscattered and reflected light as a function of distance in the optical fiber link; and
from the OTDR acquisition, deriving a rating value associated with the optical fiber link, related to a value of an excess insertion loss associated with the optical fiber link under test, in excess of a nominal value of insertion loss associated with a hypothetical optical fiber link having a length corresponding to the total length of the optical fiber link under test.

14. The method as claimed in claim 13, further comprising:
from the OTDR acquisition, deriving a measured value of total length of said optical fiber link and a measured value of an insertion loss associated with the optical fiber link;
calculating a nominal value of insertion loss associated with a hypothetical optical fiber link having a length corresponding to the measured value of total length; and
deriving a value of an excess insertion loss by deducting the nominal value of said first parameter from the measured value of the first parameter.

15. An OTDR system for characterizing an optical fiber link, the OTDR system comprising:
an OTDR acquisition device connectable toward an end of the optical fiber link for performing at least one OTDR acquisition toward the optical fiber link, wherein each OTDR acquisition is performed by propagating in the optical fiber link under test, a pulsed test signal and detecting corresponding return light from the optical fiber link representing backscattered and reflected light as a function of distance in the optical fiber link; and a processing unit receiving the OTDR trace and configured to:
from the OTDR acquisition, derive a measured value of total length of said optical fiber link and a measured value of the insertion loss associated with the optical fiber link;
calculate a nominal value of insertion loss associated with said hypothetical optical fiber link having a length corresponding to the measured value of total length; and
derive a value of an excess insertion loss associated with the optical fiber link under test, in excess of the nominal value.

16. The OTDR system as claimed in claim 15, wherein:
the processing unit is further configured to derive a rating value associated with the optical fiber link, at least from the derived value of excess insertion loss; and
the OTDR system further comprises a display to display said rating value.

17. The OTDR system as claimed in claim 15, wherein the processing unit is further configured to, from the OTDR acquisition, derive a value of excess back reflections associated with the optical fiber link under test, in excess of a nominal value of a back reflections associated with a hypothetical optical fiber link having a length corresponding to the total length of the optical fiber link under test.

18. The OTDR system as claimed in claim 17, wherein deriving a value of excess back reflections comprises:
from the OTDR acquisition, calculating the value of excess back reflections by integrating portions of the OTDR acquisition corresponding to reflectance peaks.

19. A method for characterizing an optical fiber link, the method comprising:
propagating a test signal test in the optical fiber link under test from one end thereof and detecting a power level of said test signal at the other end of the optical fiber link to derive therefrom a total insertion loss of the optical fiber link;
calculating a time of flight of said test signal between the one end and the other end and deriving therefrom a total length of the optical fiber link;
deriving a value of an excess insertion loss associated with the optical fiber link under test, in excess of a nominal value of insertion loss associated with a hypothetical optical fiber link having a length corresponding to the measured total length of the optical fiber link under test.

20. The method as claimed in claim 19, wherein the nominal value is calculated at least from the measured value of total length and a value of at least one constant of proportionality.

21. The method as claimed in 19, further comprising:
deriving a rating value associated with the optical fiber link, at least from the derived value of excess insertion loss; and
outputting said rating value.

* * * * *